United States Patent [19]

Vasco

[11] Patent Number: 4,511,091

[45] Date of Patent: Apr. 16, 1985

[54] METHOD AND APPARATUS FOR RECYCLING THERMOPLASTIC SCRAP

[76] Inventor: Augusto Vasco, 7 E. Beech St., Central Islip, N.Y. 11722

[21] Appl. No.: 456,282

[22] Filed: Jan. 6, 1983

[51] Int. Cl.³ .............................................. B02C 23/18
[52] U.S. Cl. .......................................... 241/18; 241/3; 241/23; 241/65
[58] Field of Search ................... 241/3, 23, 65, 66, 67, 241/18, DIG. 37, 100, 151; 264/37

[56] References Cited

U.S. PATENT DOCUMENTS

| | | | |
|---|---|---|---|
| 2,588,448 | 3/1952 | Worm, Jr. et al. | 241/151 X |
| 2,792,042 | 5/1957 | Dwyer et al. | 241/65 |
| 3,786,844 | 1/1974 | Smearsoll et al. | 241/100 X |
| 3,921,917 | 11/1975 | Meinass | 241/65 X |
| 4,222,527 | 9/1980 | Davis | 241/DIG. 37 X |

Primary Examiner—Mark Rosenbaum
Attorney, Agent, or Firm—Robert Mauer

[57] ABSTRACT

A method and mechanical device for recycling thermoplastic scrap that collects the hot excess waste material that is trimmed off the edges of phonograph records immediately after they are pressed in a hydraulic record press. There is provided a tapered vertical shaft, widening at the bottom, which is secured to the base of a grinder. After a phonograph record is pressed flat, the hot excess thermoplastic scrap which extrudes from the edges is trimmed and allowed to drop into the upper opening of the shaft in the form of thirty inch strips. A motor or other means for blowing cold air is attached to an opening in the side of the shaft. The falling hot thermoplastic scrap is allowed to fall onto a horizontal platform surface located approximately twenty inches below the top of the shaft, where it is held and cooled by the blower for approximately twenty-six seconds, corresponding with the time it takes to press a record flat and trim the flash. The platform is then horizontally pushed out of the shaft by air pressure provided by front and rear conduits that are coupled to valves located on the hydraulic record press. The air pressure urges the platform in and out using the same energy supplied to the hydraulic record press. The cooled scrap falls into the grinder, where it is pulverized and mixed with similar vinyl plastic material and again used to form new phonograph records.

18 Claims, 4 Drawing Figures

METHOD AND APPARATUS FOR RECYCLING THERMOPLASTIC SCRAP

BACKGROUND OF THE INVENTION

This invention relates to methods and devices for recycling thermoplastic scrap and, more particularly, to methods and devices which permit the excess hot thermoplastic waste extruded out of the edges of phonograph records immediately after they are pressed in a hydraulic record press, to be cooled and reused as a constituent material in the production of new records.

The broad concept of cooling hot thermoplastic scrap so that it could be ground for reuse is well known. A method for melting and reusing thermoplastic scrap is disclosed by Corbett et al. in U.S. Pat. No. 3,607,999. The waste material falls on a conveyor, where it is heated and then densified by rollers. The hot scrap is then cooled by nozzles so that it can be ground in the grinder. From the grinder, the scrap is conveyed to a heated extruder for reuse.

Another method for recovering and utilizing thermoplastic scrap is disclosed by McKenzie, et al. in U.S. Pat. No. 3,883,624. The waste material is first ground, then heated and cooled so that it can be ground again in the grinder. The ground scrap is then blended with virgin resin in the blender and subsequently formed into a finished product.

These methods are complex, requiring many independent steps, using complicated, expensive and cumbersome machinery.

In the current conventional process of manufacturing plastic records, vinyl plastic powder from the grinder is dropped from a trough, into a vertical tube, where it is heated until it is liquified, then forced out of a small opening into a metal mold where it forms a "cake" about five (5) inches in diameter and one (1) inch thick. A slide cylinder places a label on top and bottom of the cake, and swings it into the hydraulic press, where upper and lower dies come together. The cake is squeezed by some 1800 psi of pressure, forming the record, and extruding a thin portion of the vinyl plastic around the edge of the record, called the "flash". Grippers on either side of the press grip or seize the record by the flash and carry it by sliding it across to two circular metal plates. The surfaces of the plates, which come in contact with the record, are made of rubber, which will not damage the record when the plates come together to hold the record in place.

The record and plates are rotated around a knife blade, which trims off the flash, allowing it to fall down in the shape of a vertical strip. This strip is received, at a temperature of approximately 200 degrees Fahrenheit, by a large barrel located beneath the apparatus. When the barrel is filled by the strips, it is pulled away manually, and brought to the grinder, where the strips, which have become intertwined forming a loose mass, are then ground, in bulk, to form new vinyl plastic powder, which is then reheated and forced into the extruder, and the system begins anew.

A disadvantage of the current system is that the barrels take up a lot of space, limiting the number of record press machines that can be operating in a given area. More machines would mean greater profits to the record manufacturer since the record output would be increased. However, manufacturing space is expensive and any increased profit that would flow from an increase in the number of machines, would be reduced by having to provide more space to contain them.

The strips of flash that are trimmed from the hot, newly formed records take a long time to cool, and must be transported manually to the grinder. This creates a further financial investment since the slow cooling process further delays the operation, and the manual labor needed to transport the material is expensive.

Feeding a large number of the intertwined strips into the grinder causes the blades to continually wear down and require replacing, again slowing the operation.

A further drawback is that the current system is not energy efficient, and requires use of independent electrical, hydraulic or other energy sources to operate.

In general, the prior art methods are complicated, in that they require numerous sophisticated, independent operations to function. They are discontinuous, thereby slowing down production time, and require expensive equipment and manpower to operate.

SUMMARY OF THE INVENTION

Therefore, the main object of this invention is to provide a method and device that will recover thermoplastic waste in an efficient manner by means of which the aforesaid drawbacks and disadvantages may be most efficaciously avoided.

A further object of this invention is to provide such a method and device that will require less time in the cooling process of the hot thermoplastic scrap.

It is yet another object of this invention to provide a method and device that will make it possible to reuse the hot thermoplastic scrap material at the same time the records are being pressed, utilizing the already existing steam and electrical energy of the hydraulic record press.

It is still another object of this invention to provide a simple and continuous system whereby all of the thermoplastic scrap produced in manufacturing procedures of the type referred to can be successfully recycled without adversely affecting the quality of the finished product.

It is still a further object of this invention to provide a method and device for recovering thermoplastic scrap that is simple, inexpensive, and occupies less space than those presently existing.

It is yet another object of this invention to provide a method and device for recovering thermoplastic scrap that minimizes the amount of manual labor presently required.

It is yet a further object of this invention to provide a method and device for recycling thermoplastic scrap that reduces the amount of wear on the grinder blades by permitting the flash from each record to fall separately onto the grinder, one at a time, thus imposing less pressure on the blades and working parts of the grinder.

Generally speaking, the objectives of the present invention are obtained by the provision of a method and device for recycling thermoplastic scrap comprising, a vertically oriented tubular member having upper and lower ends adapted to receive thermoplastic scrap at the upper end thereof, platform means located interjacent the upper and lower ends of said tubular member and adapted to be moved between a first position within said tubular member and a second position at least partially without said tubular member, fluid circulating means located between said platform means and the upper end of said tubular member for cooling said thermoplastic scrap, and pulverizing means coupled to the lower end of said tubular member for pulverizing said cooled thermoplastic scrap.

BRIEF DESCRIPTION OF THE DRAWINGS

The foregoing and other subjects and features of the present invention will be more clearly understood from the following detailed description thereof when read in conjunction with the accompanying drawings, in which.

DESCRIPTION OF THE PREFERRED EMBODIMENTS

The structure described herein is useful in recovering thermoplastic scrap and may be used, for example, in the recording industry and will therefore be described with regard to a phonograph record manufacturing operation.

Figure 1:
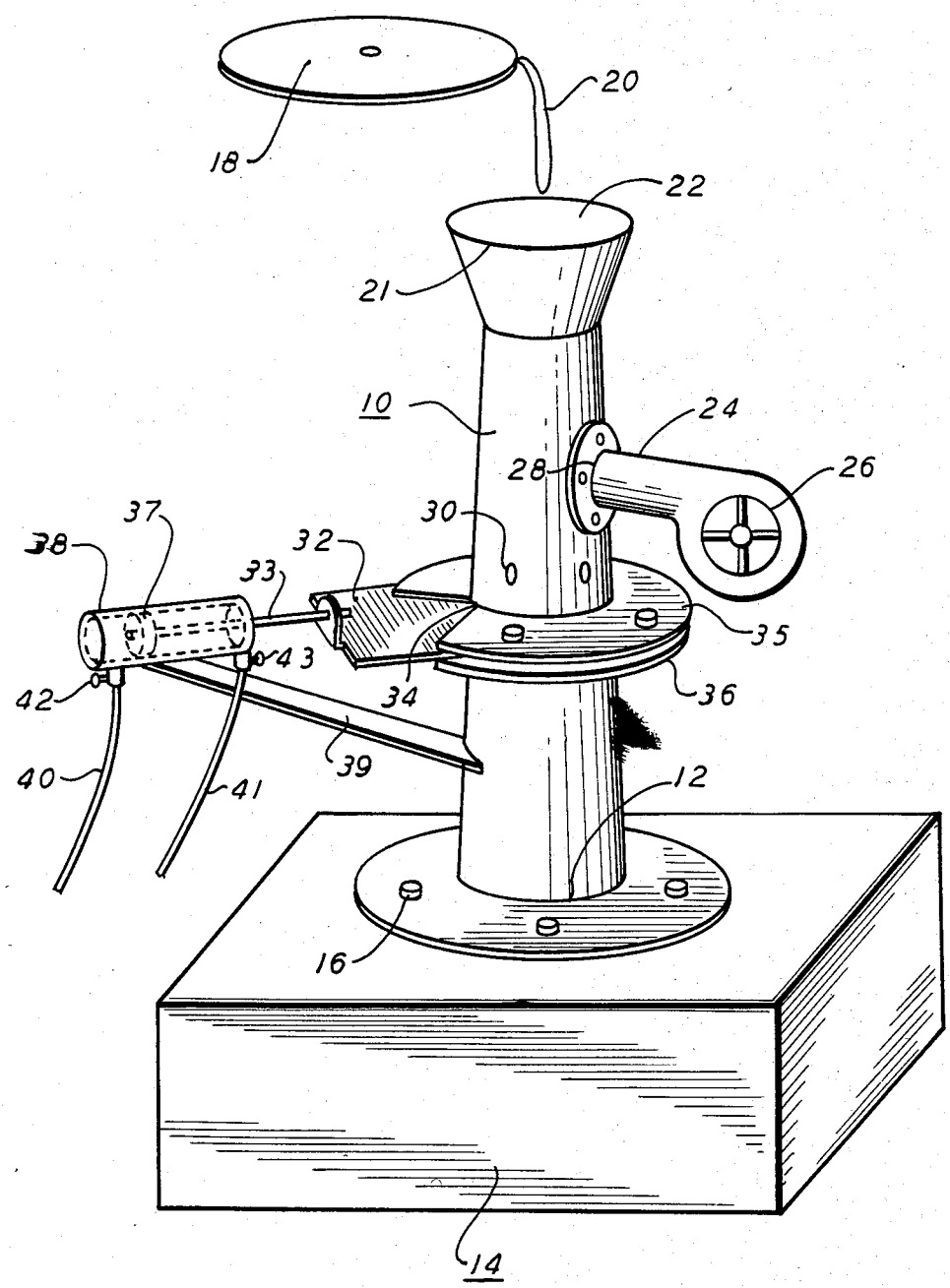
FIG. 1 is a perspective view of one embodiment of the recycling mechanism of the instant invention.

Turning first to FIG. 1 there is illustrated a generally cylindrical, or tubular, vertically oriented shaft 10 that is thirty inches high and tapered so as to be wider at the base, 12, thereof, which shaft is secured at the lower end thereof, to a portable grinder 14 by means of bolts 16. After a phonograph record 18 is pressed flat in a hydraulic record press, the hot thermoplastic scrap, indicated at 20, which extrudes from the edges, is trimmed and allowed to drop into an opening 22 at the upper end of the vertical shaft 10 in the form of thirty inch strips, weighing approximately forty grams each. The opening 22 of the vertical shaft 10 may be flared so as to provide a greater open area in which to receive the falling scrap material.

A blower 24, which is driven by a motor 26, is attached to the vertical shaft 10 adjacent to an aperture 28 formed in the shaft through which blown air is forced. The aperture 28 is located fourteen inches below the opening 22 of the vertical shaft 10. A number of holes 30 are formed in the sides of the shaft 10 and serve to prevent buildup of temperature inside the shaft 10 due to the heat (approximately two hundred degrees Fahrenheit) generated by the hot thermoplastic strips 20.

A sliding platform 32 consisting of a thin metal plate, bolted to one end of a piston rod 33, is located eighteen inches below the opening 22 of the vertical shaft 10. A horizontal opening or slit 34 in the vertical shaft 10 is provided for permitting the platform 32 to slide in and out of the shaft 10. A pair of flanges 35 and 36 are coupled to the shaft 10 above and below the slit 34, respectively, and are connected to one another to provide structural support for the shaft.

The other end of the piston rod 33 is connected to a piston 37 located within an air cylinder 38 that is supported in any conventional manner, for example, by a strut 39. The piston 37 is driven back and forth inside the air cylinder 38 by air pressure that is supplied through conduits 40 and 41 that are coupled to valves 42 and 43, respectively, located on the air cylinder 38 on opposite sides of the piston 37. The other ends of the conduits 40 and 41 lead to similar valves located on the hydraulic record press. The conduit 41, coupled to the front valve 43 of the air cylinder 38, provides the air-path necessary for driving the platform 32 out of the shaft, and the other conduit 40, connected to the rear valve 42 of the air cylinder 38, provides the air path necessary for driving the platform 32 into the shaft. These conduits 40 and 41 are coupled to the same pressure lines that open and close the hydraulic record press. Air pressure is released every twenty-six seconds. The downward pressure of the hydraulic record press, compressing a record, causes the air pressure in the front conduit 41 to drive the platform 32 out. When the compression is released in the hydraulic press twenty-six seconds later, the same air pressure that releases the hydraulic record press is transmitted through the rear conduit 40 urging the platform 32 inwardly.

When the platform 32 is in a position wholly within the vertical shaft 10, it blocks the passageway inside the shaft 10, and the hot thermoplastic scrap 20 that falls through the shaft 10 falls onto the platform 32 which provides a horizontal surface. When the scrap 20 strikes this surface, it forms a ring around the edges. It remains there for twenty-six seconds, where it is cooled by the blower 24, whereupon the air pressure transmitted through the front conduit 41 pushes the sliding platform 32 out, allowing the cooled plastic material to fall into the grinder 14, where it is pulverized and mixed with similar vinyl plastic material to be used in the formation of new phonograph records.

Figure 3:
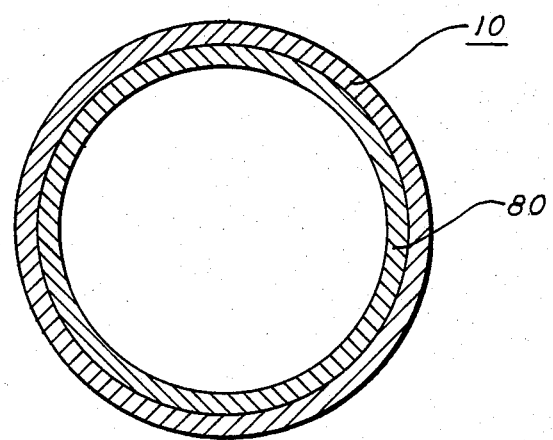
FIG. 3 is a sectional view taken along line 3—3 in FIG. 1.

Tapering the shaft 10 so as to be wider at the base 12, and lining the inside of the shaft with a non-stick material 80, such as, for example, Teflon, as shown in FIG. 3, will permit the cooling ring of thermoplastic scrap to fall freely without sticking to the inside of the shaft.

Figure 2:
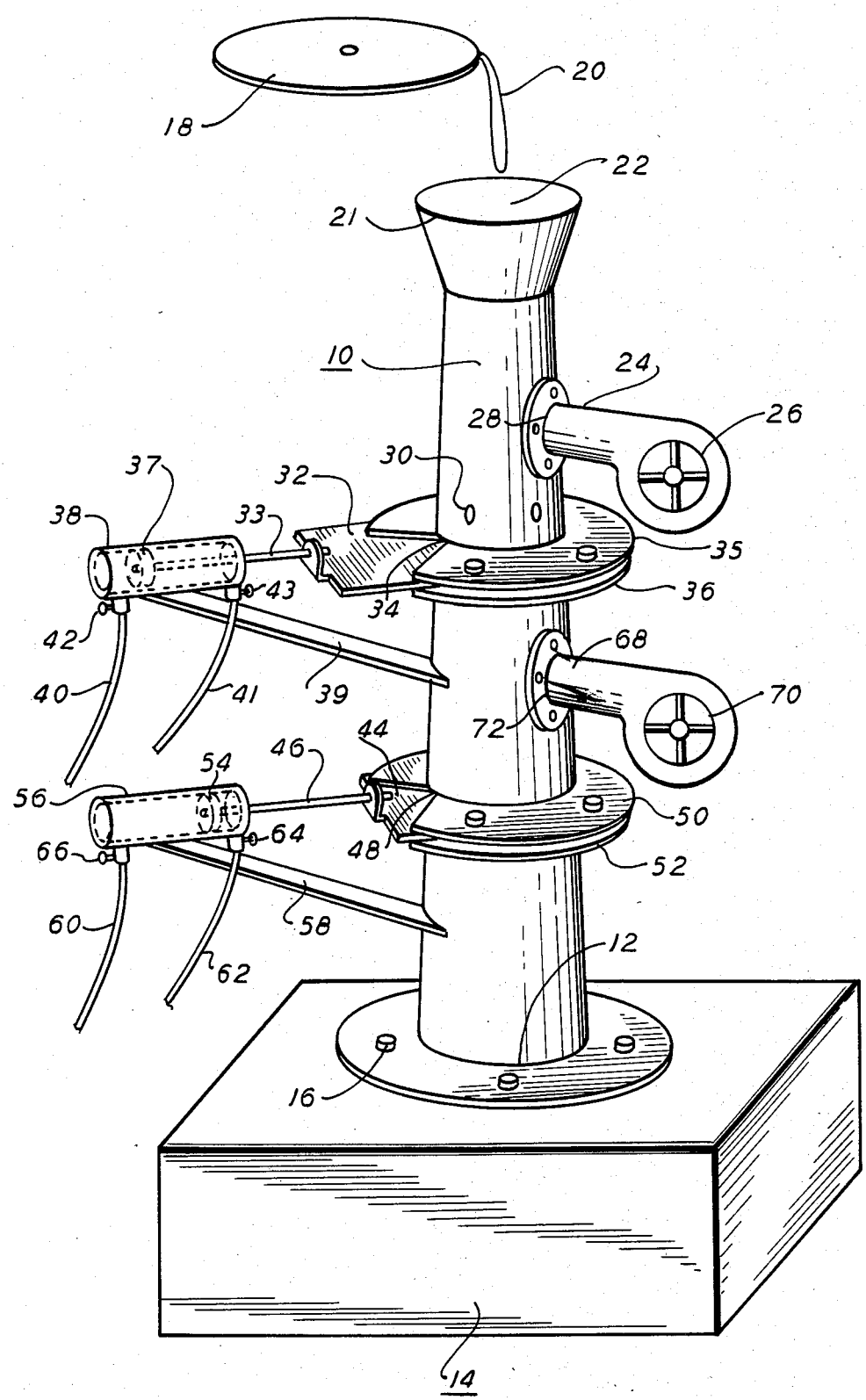
FIG. 2 is a perspective view of a second embodiment of the recycling mechanism of the instant invention.

In another embodiment of the present invention, as shown in FIG. 2, where portions corresponding to those illustrated in FIG. 1 are indicated by corresponding numbers, there is provided a second sliding platform 44 formed from a thin metal plate, connected to one end of a piston rod 46, and located six inches below the first platform 32. The second platform 44 is positioned to move into and out of a second horizontal opening or slit 48 formed in the vertical shaft 10. Here, as in FIG. 1, a pair of flanges 50 and 52 are provided above and below the slit 48 and are bolted together to provide structural support. The other end of the piston rod 46 is connected to a piston 54 located within a second air cylinder 56 that is supported by a strut 58 coupled to the vertical shaft 10. The piston 54 is driven back and forth inside the second air cylinder 56 by air pressure that is supplied through conduits 60 and 62 that are coupled to valves 66 and 64, respectively, located on the second air cylinder 56 on opposite sides of the piston 54. The other ends of the conduits 60 and 62 lead to similar valves located on the hydraulic record press. A second blower 68, which is driven by a motor 70, is attached to the vertical shaft 10 adjacent to an opening 72 formed in the shaft through which blown air is forced. The opening 72 is located three inches below the first platform 32.

In operation, when this structure is used in connection with the pressing of phonograph records, the air pressure released through the valves on the hydraulic record press is timed to the formation of the records in the hydraulic record press, driving the platform 44 inside the shaft 10 when the "cake" is released, and pushing the platform 44 out when the cake is being compressed into a flat record by the hydraulic record press. The two platforms 32 and 44 operate sequentially, the second platform 44 being in position to receive the flash 20 as soon as the first platform 32 is pushed out.

After twenty-six seconds, the second platform 44 is pushed out of the horizontal opening 48 located on the side of the shaft 10, by air pressure in the front conduit 62, and the cooled thermoplastic scrap falls into the grinder 14. After the scrap is ground into a powdery consistency in the grinder 14, it is reheated into a viscous liquid and forced into an extruder where it emerges to begin the process anew.

The embodiment described in FIG. 1 is simpler, more efficient and much cheaper to fabricate then the one described in FIG. 2, and may readily be utilized in most hydraulic record press operations. However, there are occasions when the hydraulic press will be required to operate at higher temperatures, for example, when the composition of the thermoplastic scrap is such that more heat is needed to manufacture the records. Under these circumstances, the embodiment described in FIG. 1 will not cool the hotter thermoplastic scrap quickly enough to be pulverized by the grinder 14 in a continuous operation. This problem is overcome by using the embodiment described in FIG. 2, wherein the thermoplastic scrap is cooled at a much faster rate, permitting the cooling process to remain synchronized with the normal operating time of the hydraulic record press.

Figure 4:
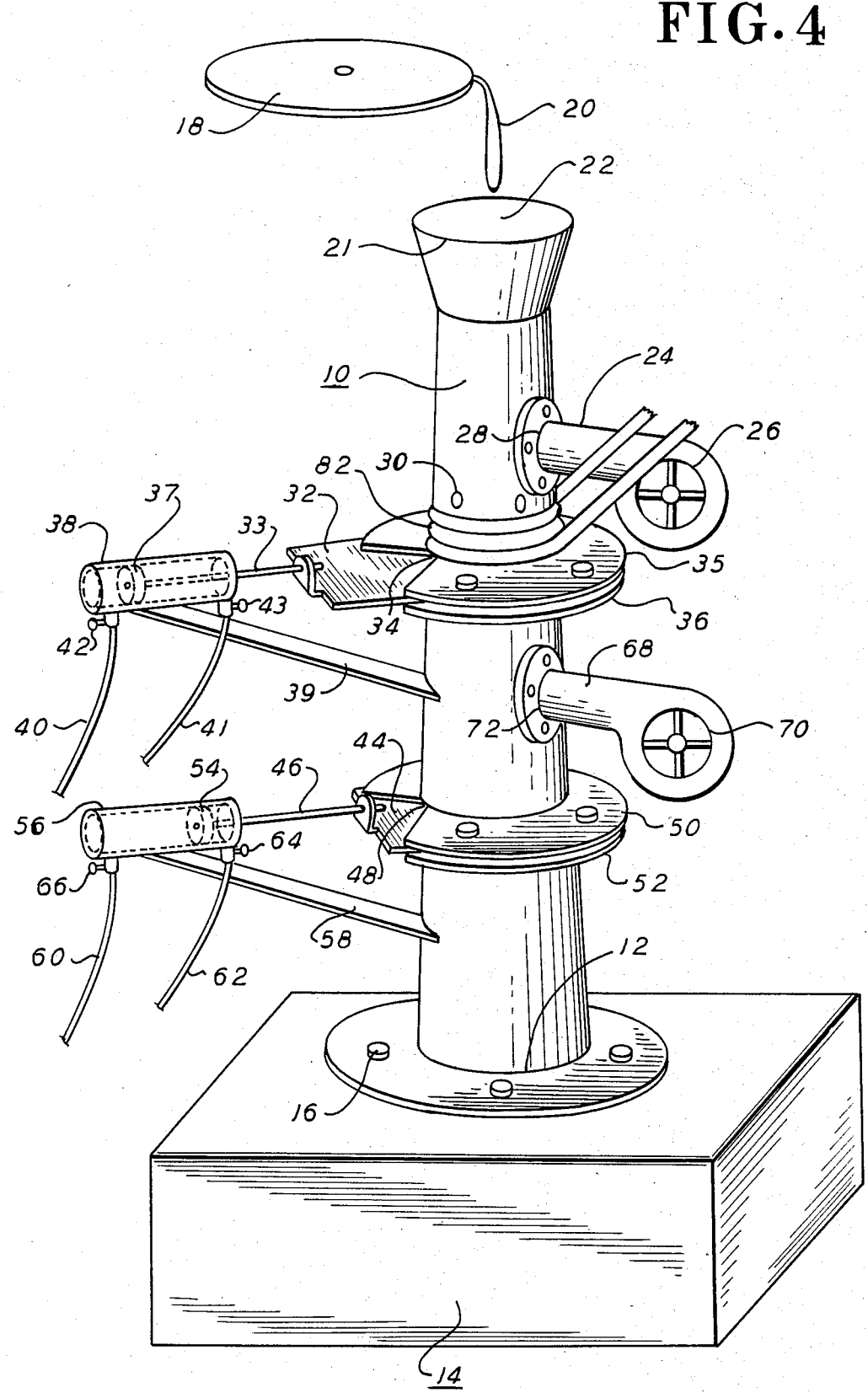
FIG. 4 is a perspective view of a third embodiment of the recycling mechanism of the instant invention.

The cooling rate of the thermoplastic scrap may be further increased, if needed, by circulating a coolant, such as cold water, around the shaft 10, for example, as shown in FIG. 4, by providing tubing 82 wrapped about the shaft 10 and having the coolant circulate within said tubing. The tubing 82 may, of course, be attached to the shaft 10 in any conventional manner.

It is also possible, of course, to regulate the cooling time according to the temperature of the thermoplastic scrap when utilizing the embodiment of FIG. 2. This may be accomplished by operating the device with only the upper sliding platform 32 operating, or, if the scrap is still not sufficiently cooled, by using both sliding platforms 32 and 44 in sequence as described above. Finally, if the cooling rate is still not sufficient, coolant may be circulated around the shaft as illustrated in FIG. 4.

It will be understood that the foregoing descriptions of the preferred embodiments of the present invention are for purposes of illustration only, and that the various structural and operational features as herein disclosed are susceptible to a number of modifications and changes, none of which entail any departure from the spirit and scope of the present invention as defined in the hereto appended claims.

I claim:

1. A device for immediately recycling hot thermoplastic scrap extruded out of the edges of newly formed phonograph records comprising:
    a vertically oriented tubular member having a passageway and upper and lower ends said tubular member adapted to receive hot thermoplastic scrap at the upper end thereof;
    platform means located between the upper and lower ends of said tubular member and drive means to move said platform means between a first position within said tubular member which blocks the passageway so that said scrap can fall onto said platform means and a second position at least partially without said tubular member so that said scrap can fall through said tubular member; said platform means being wide enough to permit the hot thermoplastic scrap to spread out and expose much of its surface area to the surrounding temperature when in said first position;
    fluid circulating means located between said platform means and the upper end of said tubular member for cooling said thermoplastic scrap when said platform means is in said first position; and
    pulverizing means coupled to the lower end of said tubular member for pulverizing said cooled thermoplastic scrap.

2. A device for recycling thermoplastic scrap according to claim 1 wherein said tubular member is tapered, widening at the bottom to prevent said thermoplastic scrap from sticking to the inside of said tubular member.

3. A device for recycling thermoplastic scrap according to claim 1 wherein said fluid is air and said fluid circulating means is a fan.

4. A device for recycling thermoplastic scrap according to claim 1 wherein a second platform means, adapted to be moved between a first position within said tubular member and a second position at least partially without said tubular member, receives the scrap from the first platform.

5. A device for recycling thermoplastic scrap according to claim 1 wherein said tubular member is coated on the inside with a non-stick material.

6. A device for recycling thermoplastic scrap according to claim 1 wherein said tubular member is formed with vent holes to prevent heat buildup in said member.

7. A device for recycling thermoplastic scrap according to claim 1 wherein the opening at the top of said tubular member is flared.

8. A device for recycling thermoplastic scrap according to claim 1 wherein a coolant is circulated around said tubular member.

9. A device for recycling thermoplastic scrap according to claim 1 wherein tubing is wrapped around said tubular member and a coolant is permitted to circulate within said tubing.

10. A method for immediately recycling hot thermoplastic scrap extruded out of the edges of newly formed phonograph records, the steps of the method comprising:
    dropping said thermoplastic scrap through a vertically oriented tubular member having upper and lower ends adapted to receive said thermoplastic scrap at the upper end thereof;
    allowing said thermoplastic scrap to fall onto the surface of a platform means located between the upper and lower ends of said tubular member, said platform means adapted to be moved between a first position within said tubular member and a second position at least partially without said tubular member;
    circulating fluid between said platform means and the upper end of said tubular member for cooling said thermoplastic scrap when said platform means is in said first position;
    moving said platform means to a position at least partially without said tubular member to allow said cooled thermoplastic scrap to continue to fall through said tubular member; and
    pulverizing said cooled thermoplastic scrap after it has fallen below the lower end of said tubular member.

11. The method of claim 10 including preventing said thermoplastic scrap from sticking to the inside of said tubular member by tapering said tubular member.

12. The method of claim 10 including circulating said fluid with a fan.

13. The method of claim 10 wherein said material is delivered to a second platform means downstream of said first platform means.

14. The method of claim 10 including coating the inside of said tubular member with a non-stick material.

15. The method of claim 10 including preventing heat buildup in said tubular member by forming vent holes in said tubular member.

16. The method of claim 10 including delivering material to said tubular member through a flared opening at the top of said tubular member.

17. The method of claim 10 including circulating a coolant around said tubular member.

18. The method of claim 10 including circulating a coolant within tubing which is wrapped around said tubular member.

* * * * *